No. 879,273. PATENTED FEB. 18, 1908.
J. H. KINEALY.
AIR PURIFYING APPARATUS.
APPLICATION FILED SEPT. 5, 1905.

WITNESSES
Harriet Hetfield
Lillie Maurer

INVENTOR
John H. Kinealy

UNITED STATES PATENT OFFICE.

JOHN H. KINEALY, OF FERGUSON, MISSOURI.

AIR-PURIFYING APPARATUS.

No. 879,273.     Specification of Letters Patent.     Patented Feb. 18, 1908.

Application filed September 5, 1905. Serial No. 277,016.

*To all whom it may concern:*

Be it known that I, JOHN H. KINEALY, a citizen of the United States, residing at Ferguson, county of St. Louis, State of Missouri, have invented a new and useful Improvement in Air-Purifying apparatus, of which the following is a full, clear, and exact specification, reference being had to the accompanying drawings, which form a part thereof.

My invention relates to that type of air purifying apparatus used in connection with heating and ventilating systems wherein the air is freed of impurities by being washed and then the moisture taken up by the air during the washing process is extracted by means of a water eliminator.

The object of my invention is to make the air supplied to buildings for ventilating purposes clean and sanitary by freeing it of impurities. And a further object of my invention is to prevent damage to furniture of schools and other ventilated buildings by avoiding the introduction of dust and dirt. And a still further object of my invention is to cool the air introduced for ventilating purposes in warm weather so as to make the air inside of the building cooler than the air outside. These several objects are attained by an apparatus by means of which the air is washed so as to free it of dirt and impurities and is then freed of entrained water by means of a water eliminator consisting of tubes formed and arranged as hereinafter described and specifically claimed.

My invention is fully shown in the accompanying drawings where similar letters are used to designate similar parts.

Figure 3:
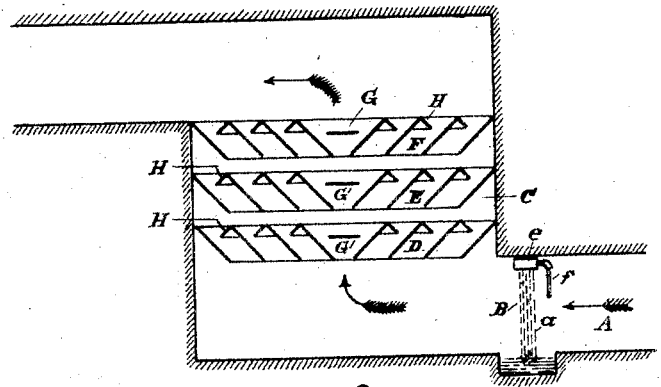
Figure 4:
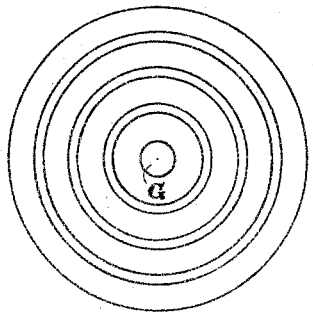
Figure 1:
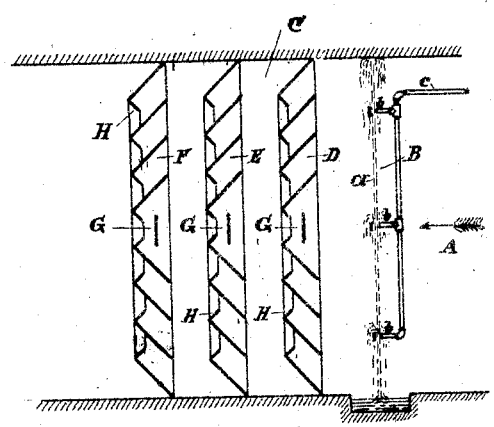
Figure 2:
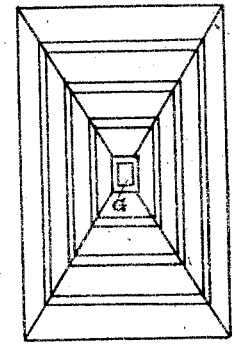

Figure 1 is a sectional view of one form of the apparatus wherein the air passes horizontally through the washer and the eliminator. Fig. 2 is a rear view of the eliminator shown in Fig. 1. Fig. 3 is a sectional view of one form of the apparatus wherein the air passes horizontally through the washer and vertically through the eliminator. Fig. 4 is a view looking downward on the eliminator shown in Fig. 3.

Referring to the figures, A is a thoroughfare for the passage of the air; B is the washer; D, E, and F are sections of the tubes forming the eliminator; G is a center plate placed in the middle tube of each section; and H are lips on the end of the tubes farthest from the washer to prevent moisture being blown through the tubes.

The washer shown in Fig. 1 consists of a screen or veil of water $a$ formed by means of the nozzles $b$ which are supplied by water through the pipe $c$. The washer shown in Fig. 3 consists of what I term a "wall" $d$ of downward falling water in a sprayed or finely divided condition. The water is made to flow downward in drops or streams. The air in passing through this wall zigzags back and forth between the drops or streams of downward falling water coming in contact, however, with some of the water and it is not necessary to blow a hole through this wall as it is when a screen or veil of water such as is shown in Fig. 1 is used and, therefore, the air is likely to be more thoroughly washed or freed of dirt than when a veil is used. This wall is formed by making the water pass from the bottom of a spray box $e$ through a number of holes of small diameter. Water is supplied under pressure to the spray box through the pipe $f$. In every case the veil or the wall of the washer extends transversely across the entire thoroughfare A.

The operation of the apparatus is as follows: The air passing through the thoroughfare A enters the washer B where it is washed by coming in contact with the veil of water as shown in Fig. 1 or the wall of water as shown in Fig. 2. By the washer the air is freed of dust and dirt, but has put into it a greater or less quantity of moisture in the form of drops of water which is carried forward with the air. After leaving the washer the air enters the eliminator where it comes in contact with the surfaces of the tubes and by rubbing on these surfaces it is made to deposit the moisture. The air rubs against the surfaces of the outside of the tubes as well as the surfaces of the inside. By making the tubes concentric and larger at one end than the other so that the walls of the tubes are inclined to the axis of the eliminator, eddies are set up which make it more certain that all the air will be brought in contact with some parts of the tubes, and be made to deposit its moisture. By forming lips on the ends of the tubes farthest from the washer moisture deposited on the tubes is prevented from being blown through the eliminator. The center plate $g$ serves to prevent an excessive amount of air from passing through the center tube.

By using cold water for the purpose of washing the air in warm weather the air may be cooled so that it may be at a lower temperature when leaving the apparatus than when entering it, and thus air supplied to a building for ventilating purposes may be made cooler than the air outside.

In the drawings the tubes are shown arranged in three sections, but the number of sections and the number of tubes in a section may be varied to suit different conditions and the thoroughfare for the air may be of any suitable material and its sizes and shape may be varied to suit each particular case. The tubes may be made of any suitable material and their size and shape may be varied to suit different conditions. The thickness of the wall of water $d$ for washing the air and the amount of water flowing from the spray box $e$ may be varied to suit the requirements of each particular case.

What I claim as new and desire to secure Letters Patent for, is:

1. In combination in an air purifying apparatus, a thoroughfare for the air, a washer, and a water eliminator consisting of tubes larger at one end than the other, said tubes being provided each with a lip at the end farthest from the washer and arranged in sections, and the tubes of each section being concentric, substantially as described.

2. In combination in an air purifying apparatus, a thoroughfare for the air, a washer, and a water eliminator consisting of tubes of the shape of a frustum of a cone, having each a lip at the end farthest from the washer and arranged in sections, and the tubes of each section being concentric, substantially as described.

3. In combination in an air purifying apparatus, a thoroughfare for the air, means for forming a transverse wall of downward falling water in a sprayed or finely divided condition, and a water eliminator consisting of tubes larger at one end than the other, said tubes being provided each with a lip at the end farthest from the wall of water and arranged in sections, and the tubes of each section being concentric, substantially as described.

4. In combination in an air purifying apparatus, a thoroughfare for the air, means for forming a transverse wall of downward falling water in a sprayed or finely divided condition, and a water eliminator consisting of tubes of the shape of a frustum of a cone provided each with a lip at the end farthest from the wall of water and arranged in sections, and the tubes of each section being concentric, substantially as described.

5. In combination in an air purifying apparatus, a thoroughfare for the air, means for forming a transverse wall of downward falling water in a sprayed or finely divided condition, and a water eliminator consisting of tubes of the shape of a frustum of a cone provided each with a lip at the end farthest from the wall of water and arranged in sections, the tubes of each section being concentric, and the middle tube having a center plate, substantially as described.

6. In combination in an air purifying apparatus, a thoroughfare for the air, a washer, and tubes larger at one end than the other, provided each with a lip at the end farthest from the washer, and arranged in sections, the tubes of each section being concentric and the middle tube having a center plate, substantially as described.

7. In combination in an air purifying apparatus, a thoroughfare for the air, a washer, and tubes larger at one end than the other arranged in sections, the tubes of each section being concentric, and the middle tube having a center plate, substantially as described.

In testimony whereof I have signed my name to this specification in the presence of two subscribing witnesses.

JOHN H. KINEALY.

Witnesses:
PAUL MEHLEN,
LILLIE MAURER.